United States Patent
Schmidt et al.

(10) Patent No.: US 7,048,396 B2
(45) Date of Patent: May 23, 2006

(54) ARRANGEMENT FOR POLARIZATION OF LIGHT

(75) Inventors: Dietrich Schmidt, Jena (DE); Christfried Symanowski, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 276 days.

(21) Appl. No.: 10/411,663

(22) Filed: Apr. 11, 2003

(65) Prior Publication Data

US 2003/0197938 A1   Oct. 23, 2003

(30) Foreign Application Priority Data

Apr. 12, 2002   (DE) ................................ 102 16 169

(51) Int. Cl.
*F21V 9/14* (2006.01)
*G02F 1/1335* (2006.01)

(52) U.S. Cl. ................................ 362/19; 353/20; 349/9

(58) Field of Classification Search ................. 362/19, 362/290, 293; 353/20; 349/9
See application file for complete search history.

(56) References Cited

U.S. PATENT DOCUMENTS

| | | | | |
|---|---|---|---|---|
| 6,243,149 B1 * | 6/2001 | Swanson et al. | ............... | 349/62 |
| 6,373,629 B1 * | 4/2002 | Yamagishi et al. | ......... | 359/487 |
| 6,739,723 B1 * | 5/2004 | Haven et al. | .................. | 353/20 |
| 6,793,341 B1 * | 9/2004 | Svardal et al. | .................. | 353/8 |
| 2001/0033418 A1 * | 10/2001 | Hayashi | ...................... | 359/487 |

* cited by examiner

*Primary Examiner*—Y. My Quach-Lee
*Assistant Examiner*—Peggy A. Neils
(74) *Attorney, Agent, or Firm*—Reed Smith LLP

(57) ABSTRACT

The invention is directed to an arrangement for the polarization of light, preferably for use in projectors. It comprises at least one illumination source, an integrator with a structural component part which is arranged in the light entrance plane, has the entrance opening, and is constructed so as to be reflecting in the direction of the interior of the integrator, as well as components for the polarization and reflection of partial beams of the light bundle entering the integrator. According to the invention, at least two reflecting polarizers are arranged in the light exit plane of the integrator in the same angular position relative to the axis of the integrator. The polarizers have polarization directions that are rotated relative to one another. Phase plates which adapt the polarizers with non-transmitted polarization directions to the polarizers with transmitted polarization directions are provided outside of the integrator.

7 Claims, 1 Drawing Sheet

ARRANGEMENT FOR POLARIZATION OF LIGHT

CROSS-REFERENCE TO RELATED APPLICATIONS

This application claims priority of German Application No. 102 16 169.0, filed Apr. 12, 2002, the complete disclosure of which is hereby incorporated by reference.

BACKGROUND OF THE INVENTION

1. Field of the Invention

The invention is directed to an arrangement for the polarization of light, preferably for use in projectors, with at least one illumination source, an integrator with a light entrance plane and a light exit plane which serves to homogenize the unpolarized light bundle proceeding from the illumination source and/or illumination sources, a structural component part which has the entrance opening and which is constructed so as to be reflecting in the direction of the interior of the integrator, and the intensity maximum of the light bundle propagates along an axis extending between the light entrance plane and the light exit plane, the surfaces formed so as to be reflecting for guiding the light bundle, and means for the polarization and reflection of partial beams of the light bundle.

2. Description of the Related Art

Known arrangements for the polarization of light, or polarization recovery systems as they are called, are located in the illumination beam path of unpolarized light sources and are applied chiefly where high illumination intensities of polarized light are desired or a particularly efficient use of the light exiting from the light source is required for the overall polarization state. In this connection, the usable polarized proportion of lamp light output must be increased to more than 50% of the total unpolarized light output.

Since this can not be implemented using conventional polarizers, e.g., birefringent crystals or polarizing sheets, prism arrangements which split the unpolarized light into two components that are polarized vertical to one another are being used to an increasing extent. The light proportion that is not polarized is subsequently rotated in the required direction by means of at least one phase plate and is added to the proportion that has already been polarized in the desired direction. Depending on the embodiment form, the condenser constant of the illumination doubles.

Polarization recovery systems are frequently used in projectors based on transmissive LCDs. They mainly have a construction similar to a honeycomb condenser, the second honeycomb plate is located near the first honeycomb plate and a raster or grid of many prism arrangements is provided instead of element lenses. The function of polarization recovery is thus linked to the improvement in the uniformity of light. Further, while they bring about an efficient use of large light sources with particularly high light output, the increase in the condenser constant being secondary, they are disadvantageous in that their construction is very complicated and the entire system is accordingly cost-intensive.

New reflective LCDs (LCOS) also require linearly polarized light for their operation. Since they are considerably smaller than the transmissive LCDs, they also need lower condenser constants in part. Further, special color management systems whose characteristics additionally limit the condenser constant are required in LCOS of the type mentioned above, for example, in 3-chip arrangements.

Under these circumstances, polarization recovery systems of the type described above can only be used to some extent, since either the light efficiency is considerably lower than in transmissive LCD systems or only special light sources delivering a low light output themselves can be used.

At Electronic Imaging 01/2002, San Jose, Calif. USA, M. Duelli, T. McGettigan (OCLI-A JDS Uniphase Corporation) and C. Pentico (Advanced Digital Optics) presented a polarization recovery system which uses a solid integrator (light mixing rod) whose light entrance element has a reflecting surface facing in the direction of the interior of the integrator and in which a reflective polarizer is arranged in the exit plane.

The light falling into the integrator via the light entrance opening is mixed by total reflection in the integrator and reaches the reflecting polarizer. While the transmission-polarized portion of the light exits the integrator through the polarizer, the light component that is not transmission-polarized arrives back at the inner surface of the light entrance element, is reflected there and is homogenized again when it passes through the integrator again. Quarter wave plates are arranged in the integrator in addition for rotating the polarization direction of the light beams. The transmission-polarized component passes through the polarizer again and is added to the light that is already transmission-polarized. This process is carried out until the light component in its entirety, with the exception of the absorbed partial beams and reflection losses, has been polarized in the desired direction and exits from the integrator. Quarter wave plates are additionally arranged in the integrator for rotating the polarization direction of the light beams.

Arrangements of this type have the advantage that the condenser constant is increased only in the ratio of the exit surface to the entrance surface of the integrator.

On the other hand, it is disadvantageous that a quarter wave plate for rotating the polarization direction is to be arranged in the interior of the light mixing rod (solid integrator) and must pass through the latter repeatedly.

OBJECT AND SUMMARY OF THE INVENTION

Proceeding from the disadvantages described above, it is the primary object of the invention to further develop an arrangement for the polarization of light using an integrator, preferably for use in projectors, in such a way that the expenditure on adjustment of the polarization-optical means is reduced and it is possible to use a hollow integrator as well as a solid integrator.

According to the invention, this object is met by an arrangement for the polarization of light of the type described in the beginning in that at least two polarizers are arranged in the light exit plane in the same angular position relative to the axis of the integrator, the polarizers have polarization directions that are rotated relative to one another, and phase plates which adapt the polarizers with non-transmitted polarization directions to the polarizers with transmitted polarization directions are provided outside of the integrator.

In principle, any number of polarizers of various shapes and sizes can be arranged in the light exit plane. It is crucial that the phase plates produce only a suitable rotation of the light beams in the desired polarization direction or generate zones, possibly of elliptic polarization, depending upon application.

Two horizontally and/or vertically divided polarizers of identical size with polarization directions which are rotated by 90 degrees relative to one another are arranged in the light exit plane of the integrator, the transmitted polarization direction of the first polarizer extending parallel to the reflecting polarization direction of the second polarizer and, outside of the integrator, the second polarizer is completely covered by a phase plate which rotates the polarization direction of this polarizer in the polarization direction of the first polarizer.

The unpolarized light enters the integrator through the entrance opening and is mixed (homogenized) when passing through to the polarizers arranged in the light exit plane, so that there is a virtually uniform distribution in this plane. The proportion of light striking the first polarizer with a direction defined at the configuration of this polarizer exits the integrator with corresponding polarization direction. Ideally, this proportion is 25% of the entire light flux. The proportion of homogenized light which strikes the second polarizer and is directed correspondingly exits the integrator in analogous manner.

Due to the fact that the phase plate is arranged behind the second polarizer, the light is rotated by 90 degrees, that is, in the direction of the partial light beams exiting from the first polarizer. Accordingly, approximately 50% of the light flux exits from the integrator so as to be polarized in the same direction. The partial light beams which strike the two polarizers and which do not exit the integrator are reflected and pass through the integrator again until the light entrance plane, wherein both light proportions are polarized vertical to one another and mixed again.

Due to the fact that the light entrance plane, except for the entrance opening, is reflective effectively in the interior of the integrator, the partial beams are reflected back again into the light exit plane. The polarization split is then carried out in the light exit plane analogous to the first passage of the light beams through the integrator. This process is repeated infinite times, so that ideally virtually 100% polarized light with the same polarization direction exits from the integrator.

Because of the opening in the light entrance plane, however, a portion of the light is lost. In order to further increase the efficiency of the arrangement, this portion would have to be coupled into the integrator again by optical means, known per se.

The polarizers and/or the phase plates should advisably be constructed as sheets and so as to be reflective. Otherwise, they would have to be able to simulate the properties of a light integrator at the side surfaces.

However, polarizers of birefringent crystals of known construction do not meet these requirements.

Wire-grid polarizers prove advantageous.

The opening for entry into the integrator can be designed in any desired manner. However, a circular opening is advantageous because it can be produced by relatively simple manufacturing techniques, particularly when hollow integrators are used.

Another advantageous constructional variant of the arrangement according to the invention consists in that a phase plate is arranged on the structural component part having the light entrance opening on the side of the structural component part that is oriented in the interior of the integrator, this phase plate having the characteristic that the polarization plane of the proportion of light that is reflected by the polarizers fastened in the light exit plane is rotated by 90 degrees after passing twice through the integrator. With this variant, the transmissive proportion of the light when passing repeatedly through the integrator can be increased by the area fraction in the light exit plane that reflected this light proportion. Polarization recovery would then also be possible with only one polarizer in the light exit plane. However, it is disadvantageous that relatively large, very cost-intensive polarizers or phase plates would have to be used. Further, in order to achieve a high efficiency, a cutout is required in the phase plate which, again, is very time-consuming to manufacture and adjust.

Aside from the disadvantages of the different variants, the arrangement according to the invention is simpler in construction and therefore less expensive to produce than the solutions of the prior art. The homogenization and polarization of the light can be carried out using hollow or solid integrators, since the elements necessary for polarization recovery are arranged for the most part in the light entrance plane or in the light exit plane and not in the interior of the integrator.

In the following, the invention will be described in more detail with reference to embodiment examples shown schematically in the drawings. Identical reference numbers in the individual drawings designate identical elements.

DESCRIPTION OF THE PREFERRED EMBODIMENTS

Figure 1:
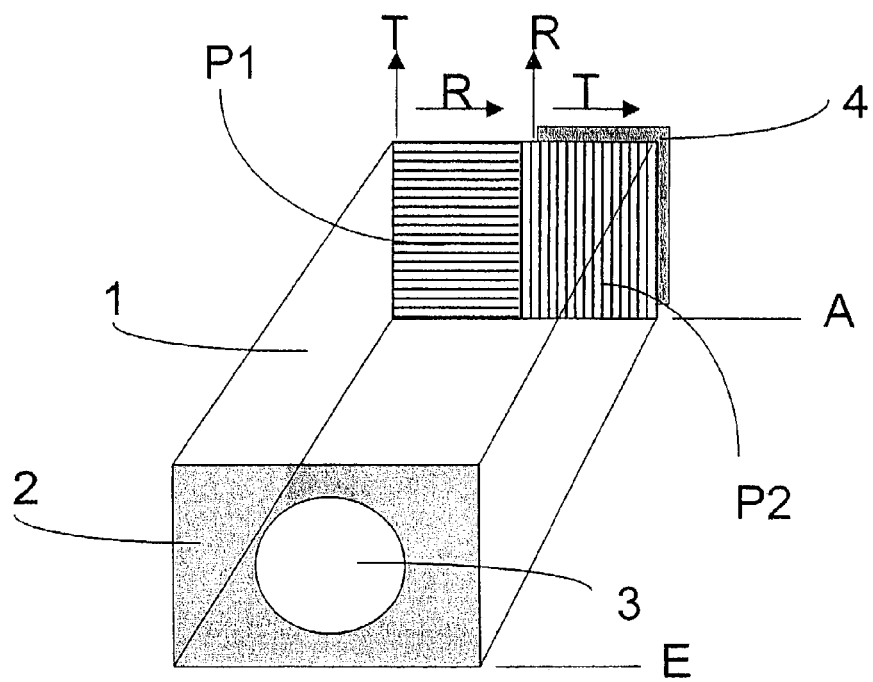
FIG. 1 is a schematic view of the integrator with divided exit surface.

FIG. 1 shows an integrator 1 which is constructed as a rectangular hollow integrator. A plate-shaped structural component part 2 having a circular entrance opening 3 is located in the light entrance plane E and is provided in the direction of the interior of the integrator 1 with a reflecting surface, not shown. Two polarizers P1 and P2 of the same size which are rotated relative to one another by 90 degrees and which completely cover the exit surface are located in the light exit plane A of the integrator 1 parallel to the light entrance plane E. The transmitted polarization direction T of the first polarizer P1 is parallel to the reflecting polarization direction R of the second polarizer P2. Outside of the integrator 1, the polarizer P2 is completely covered by a phase plate 4. The phase plate 4 is configured in such a way that the polarization direction is rotated by 90 degrees, so that it corresponds to the exiting polarization direction, that is, direction T of polarizer P1.

FIG. 1 shows that the non-polarized light coming from an illumination source passes through the entrance opening 3 into the integrator 1 and is mixed (homogenized) when passing through until the polarizers P1 and P2, so that there is virtually uniform distribution of the light flux in the light exit plane A. The proportion of light striking the first polarizer P1 with direction T defined by its configuration exits the integrator 1 with P1-T-polarization. This proportion is ideally 25% of the total light flux.

Due to the fact that the phase plate 4 is arranged behind the polarizer P2, the light proportion striking the second polarizer P2 and passing through it is rotated by 90 degrees in the direction of the light exiting from the first polarizer P1 and therefore also has P1-T-polarization. Accordingly, approximately 50% of the light flux exits the integrator 1 so as to be polarized in the same direction.

The partial light beams P1-R and P2-R striking the two polarizers P1 and P2 and not exiting the integrator 1 are reflected and pass through the integrator 1 again until the light entrance plane E, wherein both proportions P1-R and P2-R are polarized vertical to one another and mixed again.

In the light entrance plane E, the proportion of light falling on the entrance opening 3 exits the integrator 1 and is lost insofar as it is not coupled in again by optical devices, known per se. Because of the reflecting layer on the structural component part 2, which reflecting layer is oriented in the interior of the integrator 1, the partial light beams P1-R and P2-R are again reflected in their entirety on the polarizers P1 and P2, correspondingly P1-T-polarized analogous to the first passage through the integrator 1, and added to the light that has already exited. Ideally, virtually 100% P1-T-polarized light is generated after an infinite number of reflections and after the light escaping through the entrance opening 3 has been fed back.

Figure 2:
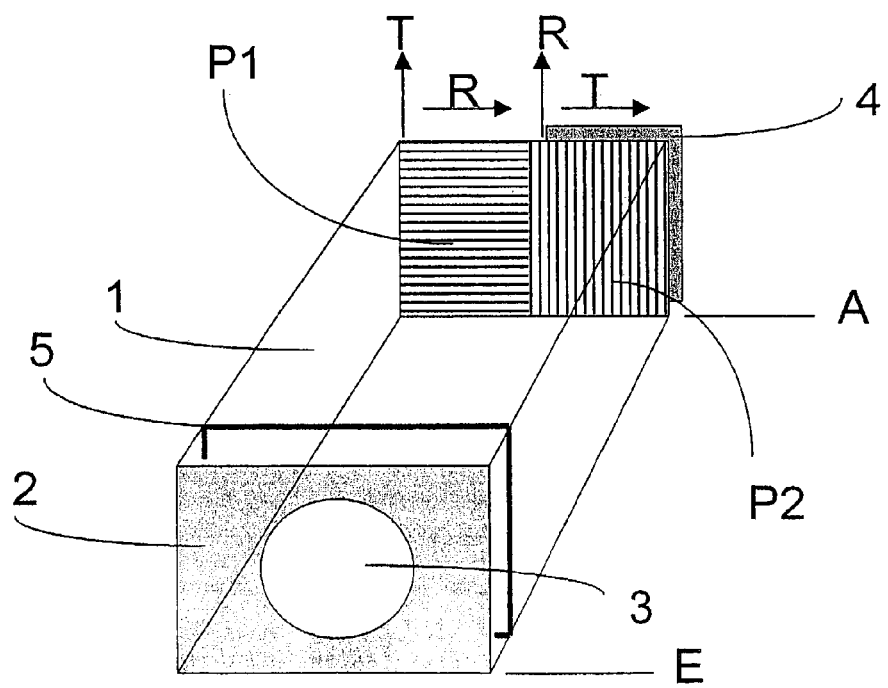
FIG. 2 is a schematic view of the integrator with a phase plate in the light entrance plane.

In a second embodiment example, FIG. 2 shows a schematic view of the integrator 1 with a phase plate 5 in the light entrance plane E. The phase plate 5 has the characteristic of rotating the polarization planes of the light proportion P1-R and P2-R reflected by the polarizers P1 and P2 when passing twice through the integrator 1 by 90 degrees again, so that the P1-T-polarized light proportion is increased when the reflected partial light beams P1-R and P2-R strike the polarizers P1 and P2 again. The phase plate 5 can be penetrated instead of the entrance opening 3 for thermal reasons. However, this does not affect its actual function.

While this variant is more efficient compared to the first embodiment example, the relatively large and therefore cost-intensive phase plate 5 has proven disadvantageous. Further, the expenditure on adjustment is very high particularly when the phase plate 5 is provided with a cutout for the entry of light.

While the foregoing description and drawings represent the present invention, it will be obvious to those skilled in the art that various changes may be made therein without departing from the true spirit and scope of the present invention.

| Reference Numbers | |
|---|---|
| 1 | integrator |
| 2 | structural component part |
| 3 | entrance opening |
| 4, 5 | phase plate |
| E | light entrance plane |
| A | light exit plane |
| P1, P2 | polarizer |
| T, R | polarization direction |

What is claimed is:

1. An arrangement for the polarization of light, for use in projectors, comprising:

at least one illumination source;

an integrator with a light entrance plane and a light exit plane which serves to homogenize the unpolarized light bundle coming from the illumination source and/or illumination sources;

a structural component part which has an entrance opening and which is constructed so as to be reflecting in the direction of the interior of the integrator, and the intensity maximum of the light bundle propagates along an axis extending between the light entrance plane and the light exit plane;

said structural component having surfaces formed so as to be reflecting for guiding the light bundle;

means for polarization and reflection of partial beams of the light bundle entering the integrator; and at least two reflecting polarizers being arranged in the light exit plane of the integrator in the same angular position relative to the axis of the integrator, the polarizers having polarization directions that are rotated relative to one another, and phase plates which adapt the polarizers with non-transmitted polarization directions to the polarizers with transmitted polarization directions being provided outside of the integrator.

2. The arrangement for the polarization of light according to claim 1, wherein two horizontally and/or vertically divided polarizers of identical size with polarization directions which are rotated by 90 degrees relative to one another are arranged in the light exit plane of the integrator, wherein the transmitted polarization direction of the first polarizer parallel to the reflecting polarization direction of the second polarizer and, outside of the integrator, the polarizer is completely covered by a phase plate which rotates the polarization direction of the second polarizer in the polarization direction of the first polarizer.

3. The arrangement for the polarization of light according to claim 1, wherein the polarizers and/or the phase plates are constructed as reflecting sheets.

4. The arrangement for the polarization of light according to claim 1, wherein the polarizers are wire-grid polarizers.

5. The arrangement for the polarization of light according to claim 1, wherein the light entrance opening is circular.

6. The arrangement for the polarization of light according to claim 1, wherein a phase plate is arranged on the structural component part having the light entrance opening on the side of the structural component part that is oriented in the interior of the integrator, said phase plate having a characteristic that it rotates the polarization direction of the proportion of light that is reflected by the polarizers fastened in the light exit plane by 90 degrees when passing twice through the integrator.

7. The arrangement for the polarization of light according to claim 6, wherein the phase plate has an opening analogous to the construction of the entrance opening.

* * * * *